(12) United States Patent
Kobayashi et al.

(10) Patent No.: US 8,769,562 B2
(45) Date of Patent: Jul. 1, 2014

(54) DIGITAL BROADCAST METHOD, DATA RECEIVING DEVICE, AND DATA TRANSMITTING DEVICE

(75) Inventors: Shunsuke Kobayashi, Fukuoka (JP); Atsushi Ichiki, Kawasaki (JP); Akira Nakagawa, Kawasaki (JP); Kiyoshi Kohiyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/085,740

(22) Filed: Apr. 13, 2011

(65) Prior Publication Data
US 2011/0187932 A1    Aug. 4, 2011

Related U.S. Application Data

(63) Continuation of application No. PCT/JP2008/069018, filed on Oct. 21, 2008.

(51) Int. Cl.
  H04N 7/10      (2006.01)
  H04N 7/025     (2006.01)
  H04N 21/433    (2011.01)
  H04N 21/422    (2011.01)

(52) U.S. Cl.
  CPC ..... *H04N 21/4331* (2013.01); *H04N 21/42215* (2013.01)
  USPC .......................................................... 725/32

(58) Field of Classification Search
  USPC ................................ 725/22; 348/563, E5.097
  See application file for complete search history.

(56) References Cited

U.S. PATENT DOCUMENTS

| | | | |
|---|---|---|---|
| 7,043,746 B2* | 5/2006 | Ma | 725/22 |
| 2002/0023167 A1* | 2/2002 | Kurihara et al. | 709/231 |
| 2002/0092017 A1* | 7/2002 | Klosterman et al. | 725/35 |
| 2002/0116471 A1 | 8/2002 | Shteyn | |
| 2003/0031455 A1* | 2/2003 | Sagar | 386/35 |
| 2003/0088872 A1* | 5/2003 | Maissel et al. | 725/46 |
| 2003/0149621 A1 | 8/2003 | Shteyn | |

(Continued)

FOREIGN PATENT DOCUMENTS

| | | |
|---|---|---|
| CN | 1628314 | 6/2005 |
| EP | 1 379 083 | 1/2004 |

(Continued)

OTHER PUBLICATIONS

International Search Report dated Jan. 13, 2009, from corresponding International Application No. PCT/JP2008/069018.

(Continued)

*Primary Examiner* — Oschta Montoya

(74) *Attorney, Agent, or Firm* — Katten Muchin Rosenman LLP

(57) ABSTRACT

A digital broadcast method includes receiving audio and video data that form a predetermined content for digital broadcasting; receiving related data indicating a content related to the predetermined content; performing a control that transmits the received related data to a data receiving device prior to transmitting the received audio data and video data; receiving the audio and video data that form the predetermined content and the related data of the predetermined content that have been subject to the control; changing a viewing channel in response to a changing instruction of the viewing channel from a viewer; and outputting, when the viewing channel is changed from a first channel number to a second channel number at the changing and then changed to the first channel number again, the received related data with audio and video data corresponding to the first channel number to an output unit.

7 Claims, 12 Drawing Sheets

(56) References Cited

U.S. PATENT DOCUMENTS

| | | |
|---|---|---|
| 2004/0133909 A1 | 7/2004 | Ma |
| 2005/0034163 A1 | 2/2005 | Nakagawa et al. |
| 2007/0092202 A1* | 4/2007 | Kamimori ................. 386/68 |
| 2008/0163311 A1* | 7/2008 | St. John-Larkin .......... 725/68 |
| 2008/0222118 A1* | 9/2008 | Scian et al. ............... 707/3 |
| 2009/0070387 A1* | 3/2009 | Bouse et al. ............. 707/200 |
| 2009/0178092 A1 | 7/2009 | Nakagawa et al. |
| 2010/0199318 A1* | 8/2010 | Chang et al. ............. 725/97 |

FOREIGN PATENT DOCUMENTS

| | | |
|---|---|---|
| JP | 2001-36851 | 2/2001 |
| JP | 2002-51321 | 2/2002 |
| JP | 2002-320157 | 10/2002 |
| JP | 2004-519893 | 7/2004 |
| JP | 2006-515478 | 5/2006 |
| JP | 2007-116417 | 5/2007 |
| WO | 03/005711 | 1/2003 |
| WO | 03/079690 | 9/2003 |

OTHER PUBLICATIONS

Supplementary European Search Report dated Oct. 26, 2012, from corresponding European Application No. 08877531.7.

Chinese Office Action dated Jan. 21, 2013, from corresponding Chinese Application No. 200880131583.4.

Notice of Rejection dated Mar. 19, 2013, from corresponding Japanese Application No. 2010-534618.

* cited by examiner

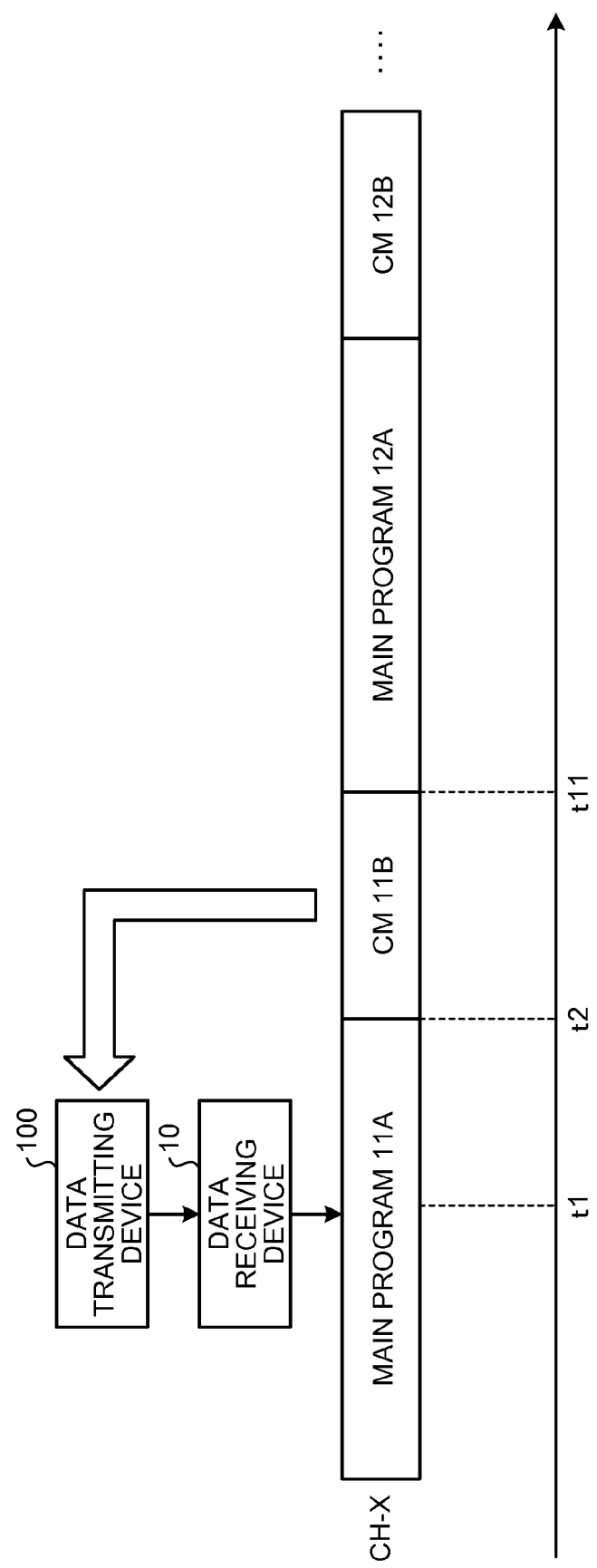

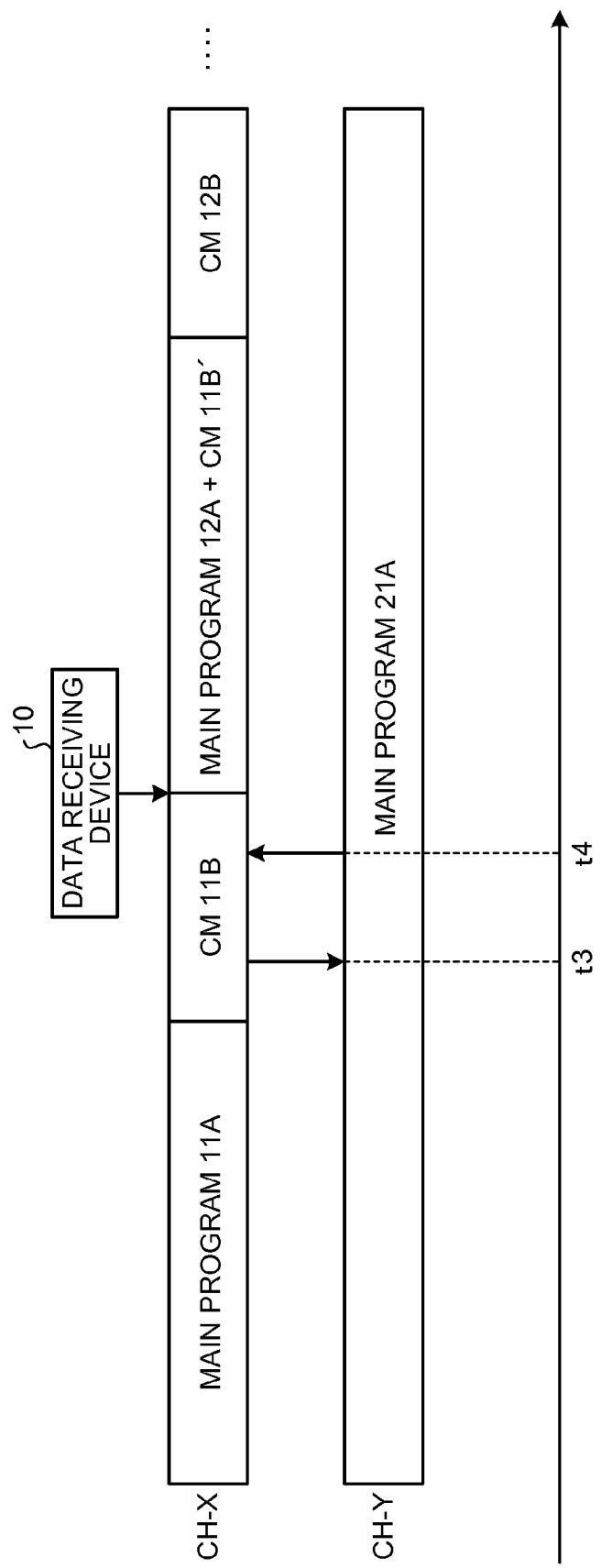

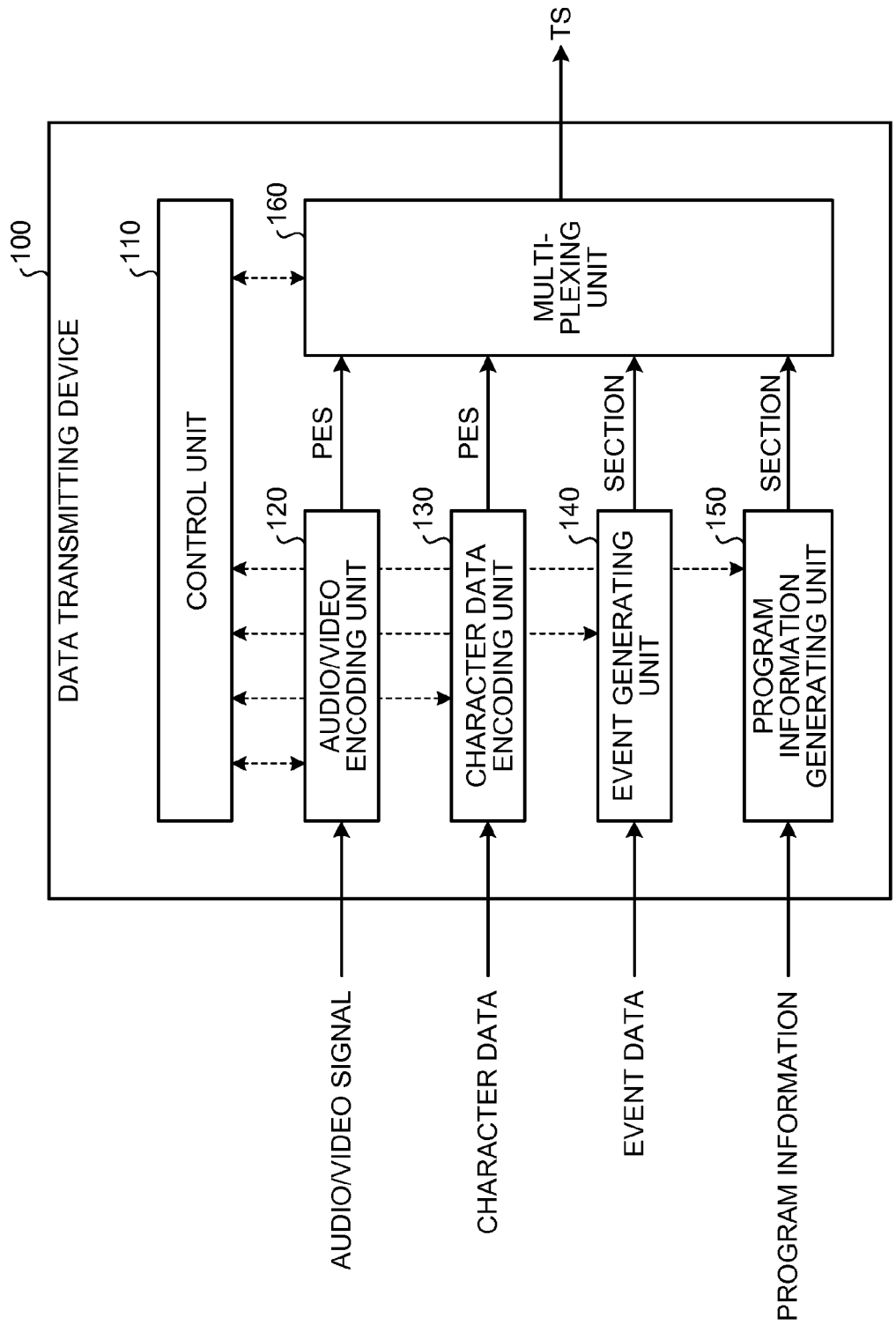

FIG.3

| DATA STRUCTURE | NUMBER OF BITS | BIT STRING NOTATION |
|---|---|---|
| CM_descriptor() { | | |
|     descriptor_tag | 8 | uimsbf |
|     descriptor_length | 8 | uimsbf |
|     Living_time | 16 | uimsbf |
| } | | |

FIG.8

| DATA STRUCTURE | NUMBER OF BITS | BIT STRING NOTATION |
|---|---|---|
| CM_event_descriptor() { | | |
| descriptor_tag | 8 | uimsbf |
| descriptor_length | 8 | uimsbf |
| event_msg_group_id | 12 | uimsbf |
| reserved_future_use | 4 | bslbf |
| time_mode | 8 | uimsbf |
| event_msg_type | 8 | uimsbf |
| event_msg_id | 16 | uimsbf |
| reserved_future_use | 4 | bslbf |
| CM_PTS [32..30] | 3 | uimsbf |
| marker_bit | 1 | bslbf |
| CM_PTS [29..15] | 15 | uimsbf |
| marker_bit | 1 | bslbf |
| CM_PTS [14..0] | 15 | uimsbf |
| marker_bit | 1 | bslbf |
| Living_time | 16 | uimsbf |
| for (i = 0; i < N; i++) { | | |
| data_byte | 8 | uimsbf |
| } | | |
| } | | |

DIGITAL BROADCAST METHOD, DATA RECEIVING DEVICE, AND DATA TRANSMITTING DEVICE

CROSS-REFERENCE TO RELATED APPLICATION

This application is a continuation of International Application No. PCT/JP2008/069018, filed on Oct. 21, 2008, the entire contents of which are incorporated herein by reference.

FIELD

The embodiment discussed herein are directed to a digital broadcast method, a data receiving device, and a data transmitting device.

BACKGROUND

In digital broadcasting (such as terrestrial digital broadcasting) of standards such as the Association of Radio Industries and Businesses (ARIB), the Advanced Television System Committee (ATSC), and the Digital Video Broadcasting Project (DVB), viewers can only watch programs without watching commercials. For example, viewers can avoid watching commercials by switching to another channel only during commercial breaks. In the present business model, if viewers do not watch commercials, sponsors may stop providing funds to create TV programs. As a result, the number of good quality programs may be reduced.

Accordingly, in recent years, for example, a technology has been proposed to insert an Entitlement Control Message (ECM) including a work key (key information for descrambling) into a commercial portion that forms a transport stream (TS) transmitted by being scrambled. With such a technology, viewers are made to watch commercials at least once.

For example, in a video-on-demand (VOD) system, a method is disclosed for inserting commercial related information on a commercial while a TV program is distributed. In this method, a user terminal stores a TV program in a storage unit and also stores commercial related information in the storage unit. When a commercial is being skipped, the user terminal reads out the commercial related information from the storage unit and displays the information with the program.

However, in the conventional technologies described above, viewers are not made to watch information on commercials, if the channel is switched to another channel only during commercial breaks. More specifically, in digital broadcasting, for example, if the channel is switched to another channel in real time only during commercial breaks, the commercials are not played back on the receiver side. If the channel is switched to another channel in real time, the commercial related information inserted into commercials or a TV program is not be stored in the storage unit. Accordingly, the problems described above cannot be solved by conventional technologies.

In the technology described above in which an ECM including a work key is inserted into the TS to be transmitted, it is assumed that the broadcast data is transmitted by being scrambled. Accordingly, it is not applicable when the broadcast data is transmitted without being scrambled.

Patent Document 1: Japanese Laid-open Patent Publication No. 2002-51321
Patent Document 2: International Publication Pamphlet No. WO 03/079690

SUMMARY

According to an aspect of an embodiment of the invention, a digital broadcast method includes receiving, by a data transmitting device, audio data and video data that form a predetermined content for digital broadcasting; receiving, by the data transmitting device, related data indicating a content related to the predetermined content; performing, by the data transmitting device, a control that transmits the received related data to a data receiving device prior to transmitting the received audio data and the received video data; receiving, by the data receiving device, the audio data and the video data that form the predetermined content and the related data of the predetermined content that have been subject to the control; changing, by the data receiving device, a viewing channel in response to a changing instruction of the viewing channel from a viewer who is watching a broadcast on a predetermined channel; and outputting, by the data receiving device, when the viewing channel is changed from a first channel number to a second channel number at the changing and then changed to the first channel number again, the received related data with audio data and video data corresponding to the first channel number to an output unit.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 1A is a schematic for explaining an outline of a data transmitting device and a data receiving device according to a first embodiment;

FIG. 1B is a schematic for explaining an outline of the data transmitting device and the data receiving device according to the first embodiment;

FIG. 2 is a configuration of the data transmitting device according to the first embodiment;

FIG. 3 is an example configuration of an advertisement-related data descriptor;

FIG. 8 is an example configuration of an advertisement-related data event;

DESCRIPTION OF EMBODIMENTS

Figure 4:
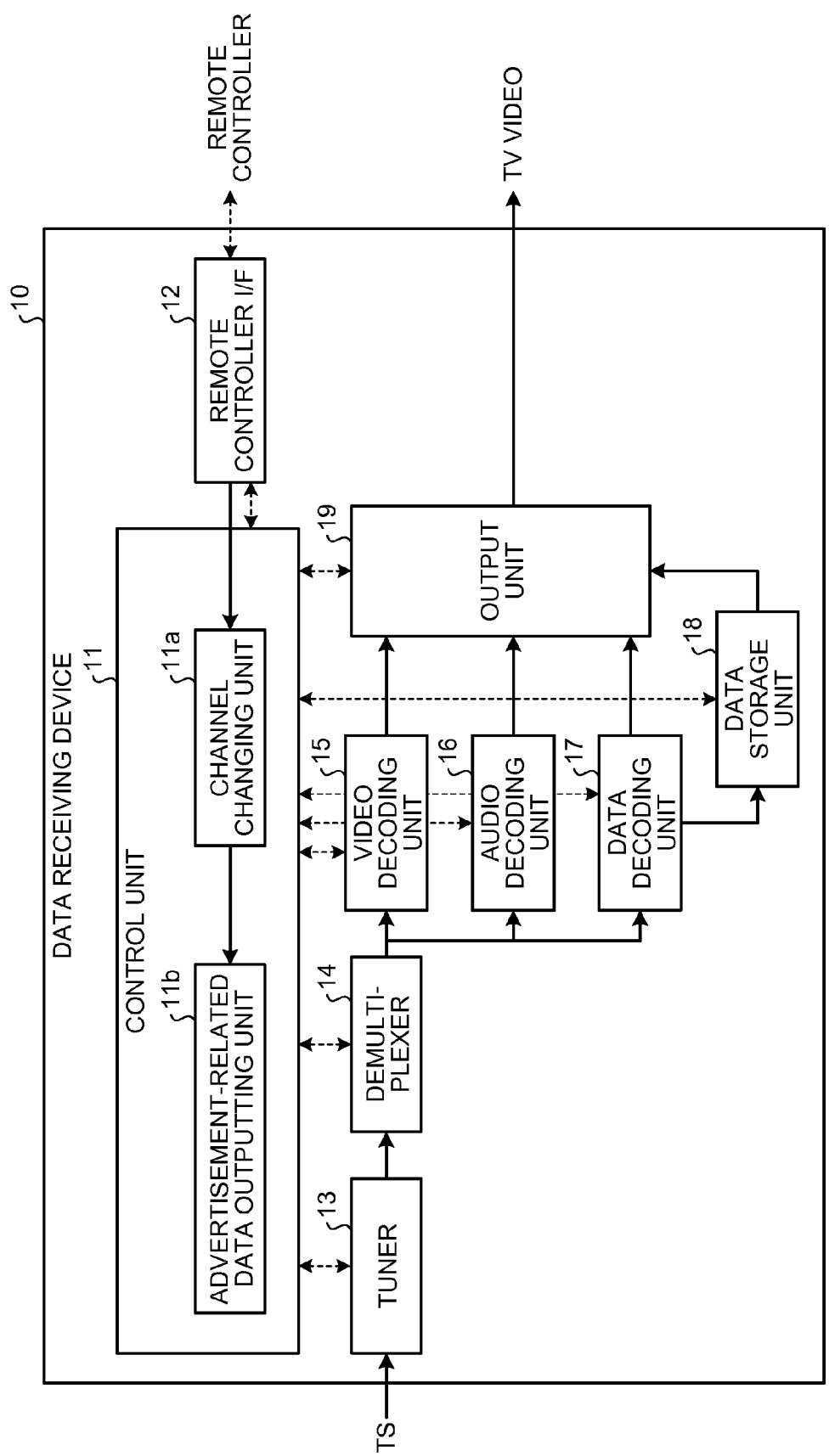
FIG. 4 is a configuration of the data receiving device according to the first embodiment.

Preferred embodiments of the present invention will be explained with reference to accompanying drawings. However, a digital broadcast method, a data receiving device, a data transmitting device, a data receiving program, and a data transmitting program according to the present invention are not limited to these embodiments.

[a] First Embodiment

A data transmitting device 100 and a data receiving device 10 according to a first embodiment will now be described with reference to FIG. 1A and FIG. 1B. FIG. 1A and FIG. 1B are schematics for explaining an outline of the data transmitting device 100 and the data receiving device 10 according to the first embodiment.

The data transmitting device 100 transmits video data, audio data, character data, and the like for digital broadcasting from a TS complying with the Moving Picture Experts Group (MPEG)-2 system standard. More specifically, the data transmitting device 100 transmits video data, audio data, character data, and the like that form a TV program (hereinafter, referred to as a "main program") or a commercial provided by a TV program production company, a provider, or the like from the TS.

The data receiving device 10 receives the TS of the video data and the like transmitted from the data transmitting device 100, and displays the received video data and the like on a predetermined display unit. At this time, the data receiving device 10 displays the video data and the like corresponding to a channel being watched by a viewer. In an example illustrated in FIG. 1A, the data receiving device 10 sequentially displays a main program 11A, a commercial (CM) 11B, a main program 12A, and a CM 12B corresponding to a channel CH-X. Hereinafter, a channel being watched by a viewer is referred to as a "viewing channel".

Viewers sometimes do not watch commercials by switching the viewing channel to another channel only during commercial breaks. For example, in the example illustrated in FIG. 1A, the viewer sometimes does not watch the CM 11B after watching the main program 11A by switching the viewing channel to another channel, and then viewing the main program 12A by switching to the original channel CH-X about when the CM 11B is finished. As described above, this means that sponsors may not provide funds to create TV programs.

Accordingly, the data transmitting device 100 according to the first embodiment transmits information indicating the content of the commercial as a TS packet of character data, before transmitting video data, audio data, and the like that form the commercial.

The "information indicating the content of the commercial" is character data in which the content of the commercial is simplified such as the name of the sponsor of the commercial, the name of the product, and the catch-phrase. For example, if the commercial is for sweets, the "information indicating the content of the commercial" is information such as the name of the company manufacturing the sweets, the name of the sweets, the characteristics of the sweets, the catch-phrase, and the sales point. Hereinafter, the "information indicating the content of the commercial" is referred to as "advertisement-related data".

In the example illustrated in FIG. 1A, the data transmitting device 100 transmits the advertisement-related data of the CM 11B before transmitting the video data, the audio data, and the like that form the CM 11B. More specifically, the data transmitting device 100 transmits the advertisement-related data of the CM 11B at a time t1 that is before a time t2 at which the video data and the like displayed by the data receiving device 10 is switched from the main program 11A to the CM 11B. Similarly, the data transmitting device 100 transmits the advertisement-related data of the CM 12B, before transmitting the video data, the audio data, and the like that form the CM 12B.

The data receiving device 10 then receives the advertisement-related data transmitted from the data transmitting device 100, and stores the received advertisement-related data in a predetermined storage ("data storage unit 18", which will be described later). Upon detecting that the viewing channel is changed to another channel and then changed to the original channel again, the data receiving device 10 obtains the advertisement-related data of the unwatched commercial from the storage. The data receiving device 10 then, at a predetermined timing, displays the obtained advertisement-related data (such as company name and product name) with the main program. The "predetermined timing" is the time at which the advertisement-related data is to be displayed or the like, and the details thereof will be described later.

With reference to an example illustrated in FIG. 1B, advertisement-related data display processing performed by the data receiving device 10 will be described. In the example illustrated in FIG. 1B, the data receiving device 10 changes the viewing channel from the channel CH-X to a channel CH-Y at a time t3 after the display content is switched from the main program 11A to the CM 11B. The data receiving device 10 also changes the viewing channel from the channel CH-Y to the channel CH-X, at a time t4 before the display content is switched from the CM 11B to the main program 12A.

At this time, upon detecting that the viewing channel CH-X is changed to another channel CH-Y, and then changed to the original channel CH-X again, the data receiving device 10 obtains the advertisement-related data of the CM 11B from the storage. In the example illustrated in FIG. 1B, the data receiving device 10 then displays the main program 12A as well as the advertisement-related data of the CM 11B (noted as a "CM 11B'" in FIG. 1B). For example, if the CM 11B is a commercial for cookies, the data receiving device 10 displays the main program 12A as well as the name of a company that manufactures the cookies and the like. A screen example displayed by the data receiving device 10 will be described later.

In this manner, the data transmitting device 100 according to the first embodiment transmits the advertisement-related data of the commercial before transmitting the video data and the audio data that form the commercial. Accordingly, even if the channel is switched to another channel by the viewer during a period of time when the commercial is displayed, the data receiving device 10 can receive the advertisement-related data of the commercial in advance.

Upon detecting that the channel being watched in real time is changed to another channel and then changed to the original channel again, the data receiving device 10 according to the first embodiment displays the advertisement-related data with the main program. Accordingly, even if the commercial is not displayed because the channel was switched, the data receiving device 10 can make the viewer watch the advertisement-related data of the commercial without fail, when the channel is switched to the original channel again.

A configuration of the data transmitting device 100 according to the first embodiment will be described with reference to FIG. 2. FIG. 2 is the configuration of the data transmitting device 100 according to the first embodiment. The data transmitting device 100 receives an audio signal, a video (or image) signal, character data, event data, and program information from the exterior (a TV program production company or the like). The data transmitting device 100 then encodes the received audio signal, the video signal, and the character data to generate a packetized elementary stream (PES). The data transmitting device 100 also generates sections by dividing the received event data and the program information into sections.

The data transmitting device 100 then divides the generated PES and the sections to generate a TS packet of 188-byte length. The data transmitting device 100 multiplexes a TS packet of the audio data, a TS packet of the video data, a TS packet of the character data, and a TS packet of the program information being generated, and transmits a TS that is a data stream of the TS packets. The TS packet of the audio data, the TS packet of the video data, the TS packet of the character data, and the TS packet of the program information are referred to as an "audio TS packet", a "video TS packet", a "character data TS packet", and a "program information TS packet" below.

The data transmitting device 100 according to the first embodiment transmits the advertisement-related data as the character data TS packet. Processing performed by each of the processing units of the data transmitting device 100 will be described in detail below.

As illustrated in FIG. 2, the data transmitting device 100 includes a control unit 110, an audio/video encoding unit 120, a character data encoding unit 130, an event generating unit 140, a program information generating unit 150, and a multiplexing unit 160.

The control unit 110 controls the data transmitting device 100. More specifically, the control unit 110 controls the audio/video encoding unit 120, the character data encoding unit 130, the event generating unit 140, the program information generating unit 150, and the multiplexing unit 160. The control unit 110 controls the multiplexing unit 160 so that the advertisement-related data of the commercial is transmitted before the video data, the audio data, and the like that form the commercial are transmitted.

The audio/video encoding unit 120 encodes an audio signal and a video signal. More specifically, the audio/video encoding unit 120 receives an audio signal from the exterior (such as a TV program production company or a provider), encodes the received audio signal, and generates a PES packet. The audio/video encoding unit 120 also encodes a video signal received from the exterior and generates a PES packet. The audio/video encoding unit 120 then outputs a PES that is a data stream of the generated PES packet to the multiplexing unit 160.

The character data encoding unit 130 encodes character data. More specifically, the character data encoding unit 130 receives character data from the exterior, encodes the received character data, and generates a PES packet. The character data encoding unit 130 then outputs a PES that is a data stream of the generated PES packet to the multiplexing unit 160.

The data transmitting device 100 according to the first embodiment transmits the advertisement-related data to the data receiving device 10 as the character data TS packet as described above. In other words, the character data encoding unit 130 receives advertisement-related data of a commercial created by a TV program production company, a provider, or the like in advance, and encodes the received advertisement-related data. The character data encoding unit 130 then outputs a PES of the advertisement-related data to the multiplexing unit 160.

At this time, the character data encoding unit 130 sets a display start time of a main program to be displayed after the commercial to a presentation time stamp (PTS: time managing information during playback) included in a header of the generated PES packet. More specifically, among a plurality of images that form the main program to be displayed after the commercial indicated by the advertisement-related data, the character data encoding unit 130 sets a value the same as that of the PTS to be set in a header of the PES packet of the first displayed image, to the PTS included in the PES packet of the advertisement-related data.

This will be described with reference to the example illustrated in FIG. 1A. Here, the character data encoding unit 130 receives the advertisement-related data of the CM 11B. In this case, the character data encoding unit 130 sets a time "t11" at which the main program 12A to be displayed after the CM 11B is first displayed, to the PTS included in the PES packet of the received advertisement-related data.

The event generating unit 140 divides event data into sections. More specifically, the event generating unit 140 divides the event data supplied from the exterior into sections, and outputs the generated sections to the multiplexing unit 160.

The program information generating unit 150 divides program information that is information on a broadcasting station and the program into sections. More specifically, the program information generating unit 150 divides the program information supplied from the exterior into sections and outputs the generated sections to the multiplexing unit 160.

The program information generating unit 150 also generates a program map table (PMT) for specifying which of the various TS packets transmitted from the data transmitting device 100 corresponds to the video TS packet, the audio TS packet, the character data TS packet, or the like, in a section format. At this time, the program information generating unit 150 generates a PMT so that the character data TS packet of the advertisement-related data can be identified from the character data TS packet other than the advertisement-related data. The character data TS packet of the advertisement-related data is referred to as an "advertisement-related data TS packet" below.

More specifically, the program information generating unit 150 sets a new descriptor complying with the MPEG-2 system standard to the PMT in association with a packet ID (PID) of the advertisement-related data TS packet. The descriptor stored in association with the PID of the advertisement-related data TS packet is referred to as an "advertisement-related data descriptor" below.

The advertisement-related data descriptor will now be described in detail with reference to FIG. 3. FIG. 3 is an example configuration of the advertisement-related data descriptor. As illustrated in FIG. 3, the advertisement-related data descriptor includes "descriptor_tag", "descriptor_length", and "Living_time".

The "descriptor_tag" is an 8-bit field to identify the type of the descriptor. The program information generating unit 150 sets one of user private values from "64" to "255" to the "descriptor_tag". Accordingly, the data receiving device 10 can identify the PID associated with the descriptor whose "descriptor_tag" is equivalent to the user private value (from 64 to 255), as the PID of the advertisement-related data TS packet. As a result, the data receiving device 10 can identify the advertisement-related data TS packet from the character data TS packet other than the advertisement-related data TS packet. The program information generating unit 150 of the first embodiment sets "64" to the "descriptor_tag" of the advertisement-related data descriptor.

The "descriptor_length" is an 8-bit field indicating the byte length of the descriptor immediately following the "descriptor_length" field. The program information generating unit 150 sets "2" to the "descriptor_length".

The "Living_time" is a 16-bit field indicating a lifetime of the advertisement-related data, and is set in seconds. The lifetime set to the "Living_time" is a period from the time set in the PTS of the PES packet including the advertisement-related data to the time from when the advertisement-related data can be displayed. For example, it is assumed that relative time information indicating "10 hours 30 minutes 00 second" is set in the PTS of the PES packet of the advertisement-related data. It is also assumed that information indicating "600 seconds" is set in the "Living_time" of the advertisement-related data descriptor stored in association with the PID of the advertisement-related data TS packet. In this case, the data receiving device 10 can start displaying the advertisement-related data from "10 hours 30 minutes 00 second" to "10 hours 40 minutes 00 second".

If an advertisement image that forms the commercial is an advertisement image group including a plurality of advertisement images, the program information generating unit 150 of the data transmitting device 100 sets a plurality of advertisement-related data descriptors relative to the advertisement images in the PMT. Accordingly, the data receiving device 10 can display a plurality of types of advertisement-related data.

The multiplexing unit 160 multiplexes the TS packet using the TS format complying with the MPEG-2 system standard, and transmits the multiplexed TS. More specifically, the multiplexing unit 160 receives a PES of video and audio from the audio/video encoding unit 120, and receives a PES of character data from the character data encoding unit 130. The multiplexing unit 160 also receives a section of the event from the event generating unit 140, and receives a section of the program information, a section of the PMT, and the like from the program information generating unit 150. The multiplexing unit 160 divides the received PES and sections, and generates a TS packet of 188-byte length.

The multiplexing unit 160 multiplexes the generated TS packet. At this time, upon receiving the PES of the advertisement-related data from the character data encoding unit 130, the multiplexing unit 160 multiplexes so that the advertisement-related data TS packet is transmitted before the video TS packet and the audio TS packet of the commercial corresponding to the advertisement-related data, based on an instruction from the control unit 110. More specifically, the multiplexing unit 160 multiplexes the advertisement-related data TS packet of the commercial, before multiplexing the PES including the first displayed image among a plurality of images that form the commercial, as the video TS packet.

A configuration of the data receiving device 10 according to the first embodiment will now be described with reference to FIG. 4. FIG. 4 is the configuration of the data receiving device 10 according to the first embodiment. As illustrated in FIG. 4, the data receiving device 10 includes a control unit 11, a remote controller interface (hereinafter, referred to as a "remote controller I/F") 12, a tuner 13, a demultiplexer 14, a video decoding unit 15, an audio decoding unit 16, a data decoding unit 17, a data storage unit 18, and an output unit 19.

The control unit 11 controls the data receiving device 10. More specifically, the control unit 11 controls the remote controller I/F 12, the tuner 13, the demultiplexer 14, the video decoding unit 15, the audio decoding unit 16, the data decoding unit 17, the data storage unit 18, and the output unit 19. The processing units of the control unit 11 will be described later.

The remote controller I/F 12 supplies an instruction of a viewer transmitted from a remote controller through infrared rays or radio waves to the data receiving device 10. For example, the remote controller I/F 12 receives a channel change instruction from the remote controller, and outputs the received channel change instruction to the control unit 11. The tuner 13 receives the TS from the data transmitting device 100, and outputs the received TS to the demultiplexer 14.

The demultiplexer 14 demultiplexes the TS supplied from the tuner 13. More specifically, the demultiplexer 14 separates the supplied TS into a video TS packet, an audio TS packet, a character data TS packet, an advertisement-related data TS packet, a PMT packet, a program association table (PAT) packet, a program clock reference (PCR) packet, and the like. The demultiplexer 14 then outputs a PAT packet whose PID is "0" to the data decoding unit 17. The data decoding unit 17 analyzes the PAT packet supplied from the demultiplexer 14 and obtains the PID of the PMT. The data decoding unit 17 then outputs the obtained PID of the PMT to the demultiplexer 14 through the control unit 11.

The demultiplexer 14 then outputs the TS packet (PMT packet) equivalent to the PID of the PMT supplied from the data decoding unit 17, to the data decoding unit 17. The data decoding unit 17 analyzes the PMT packet supplied from the demultiplexer 14 and obtains the PIDs of various TS packets. More specifically, the data decoding unit 17 obtains the PID of the video TS packet, the PID of the audio TS packet, the PID of the PCR packet, the PID of the character data TS packet, the PID of the advertisement-related data TS packet, and the like. The data decoding unit 17 then outputs the obtained PIDs of the various TS packets to the demultiplexer 14 through the control unit 11. The data decoding unit 17 in the first embodiment judges that the PID associated with the descriptor whose "descriptor_tag" is "64" is the PID of the advertisement-related data TS packet.

The demultiplexer 14 then outputs the TS packets separated as above based on the PIDs of the various TS packets supplied from the data decoding unit 17, to the video decoding unit 15, the audio decoding unit 16, and the data decoding unit 17. More specifically, the demultiplexer 14 outputs the TS packet whose PID is the PID of the video TS packet, to the video decoding unit 15. The demultiplexer 14 also outputs the TS packet whose PID is the PID of the audio TS packet, to the audio decoding unit 16. The demultiplexer 14 also outputs the TS packet whose PID is the PID of the PCR packet, the character data TS packet whose PID is the PID of the character data TS packet, and the TS packet whose PID is the PID of the advertisement-related data TS packet, to the data decoding unit 17.

The data decoding unit 17 to which the TS packet of the PCR (PCR packet) is supplied analyzes the TS packet and outputs a PCR value included in the PCR packet to the control unit 11. If the PCR value supplied from the data decoding unit 17 is an appropriate value, the control unit 11 overwrites a system time clock (STC) that is the reference time of the data receiving device 10 with the PCR value. Accordingly, the data receiving device 10 can synchronize the STC in the data receiving device 10 with the STC of the data transmitting device 100. As a result, the video, the audio, and the like can be synchronously displayed.

The video decoding unit 15 decodes the video TS packet supplied from the demultiplexer 14. If the time set in the PTS of the PES header is equal to the STC of the data receiving device 10, the video decoding unit 15 outputs the decoded video data to the output unit 19. The video data is displayed as a TV video through the output unit 19.

The audio decoding unit 16 decodes the audio TS packet supplied from the demultiplexer 14. If the time set in the PTS of the PES header is equal to the STC of the data receiving device 10, the audio decoding unit 16 outputs the decoded audio data to the output unit 19. The audio data is output as audio through the output unit 19.

The data decoding unit 17 decodes and analyzes the PAT packet, the character data TS packet, and the like supplied from the demultiplexer 14. More specifically, as described above, the PAT packet, the PMT packet, the PCR packet, the character data TS packet, the advertisement-related data TS packet, and the like are supplied to the data decoding unit 17 from the demultiplexer 14. Because the processing performed by the data decoding unit 17 when the PAT packet and the PCR packet are supplied is described above, the description thereof will be omitted here.

If the TS packet of the PMT is supplied from the demultiplexer 14, the data decoding unit 17 obtains the lifetime set in the "Living_time" of the advertisement-related data descriptor as well as performing the processing of obtaining the PIDs of the various TS packets as described above. The data decoding unit 17 then outputs the obtained lifetime to the control unit 11.

If the character data TS packet is supplied from the demultiplexer 14, the data decoding unit 17 decodes the supplied character data TS packet. More specifically, the data decoding unit 17 decodes the character data TS packet, and if the time of the PTS set in the PES header of the character data is equal to the STC, the data decoding unit 17 outputs the decoded character data to the output unit 19. The character data is displayed as character information through the data receiving device 10.

If the advertisement-related data TS packet is supplied from the demultiplexer 14, the data decoding unit 17 decodes the supplied character data TS packet, and outputs the decoded advertisement-related data to the data storage unit 18. At this time, the data decoding unit 17 outputs information (display start enabled time) set in the PTS included in the PES header of the advertisement-related data to the control unit 11.

The data storage unit 18 stores therein the advertisement-related data supplied from the data decoding unit 17. The advertisement-related data stored in the data storage unit 18 is output to the output unit 19 by the control unit 11, which will be described later, when a predetermined condition is satisfied.

The control unit 11 includes a channel changing unit 11*a* and an advertisement-related data output unit 11*b*. The channel changing unit 11*a* controls the channel change of the data receiving device 10. More specifically, upon receiving a channel change instruction from the remote controller I/F 12, the channel changing unit 11*a* changes the channel of the data receiving device 10 based on the channel change instruction.

The advertisement-related data output unit 11*b* controls output processing of the advertisement-related data. More specifically, if a viewing channel is not stored in a predetermined storage (hereinafter, referred to as a "channel storage"), the advertisement-related data output unit 11*b* stores the viewing channel in the channel storage.

Upon receiving a channel change instruction from the remote controller I/F 12, the advertisement-related data output unit 11*b* also determines whether the timer has started. If the timer has not yet started, the advertisement-related data output unit 11*b* starts the timer. At this time, the advertisement-related data output unit 11*b* sets an initial value of the timer to the STC of the data receiving device 10 at the moment at which the channel change instruction is received.

After the timer has started and when a predetermined time has passed without receiving the channel change instruction again, the advertisement-related data output unit 11*b* discards the advertisement-related data stored in the data storage unit 18. The advertisement-related data output unit 11*b* then stores the currently selected channel number in the channel storage.

The "predetermined time" is the time during which the advertisement-related data stored in the data storage unit 18 can be output. More specifically, to determine whether the predetermined time has passed, the advertisement-related data output unit 11*b* determines whether a time T of the timer satisfies the following relation (1) or (2).

$$\text{display start enabled time} \le T \le \text{display start enabled time} + \text{lifetime} \quad (1)$$

$$T < \text{display start enabled time} \quad (2)$$

The "display start enabled time" in relations (1) and (2) is the time set in the PTS included in the PES header of the advertisement-related data. The control unit 11 receives the PTS (display start enabled time) from the data decoding unit 17 as described above.

In other words, the data receiving device 10 determines whether the time T of the timer has passed the "display start enabled time+lifetime". If the time T of the timer has passed the "display start enabled time+lifetime", the data receiving device 10 determines that the "predetermined time" described above has passed. This is because the data receiving device 10 cannot display the advertisement-related data when the "display start enabled time+lifetime" has passed.

If the advertisement-related data output unit 11*b* receives the channel change instruction again, after the timer has started and before the predetermined time has passed, the advertisement-related data output unit 11*b* determines whether the channel number to be changed by the channel change instruction and the channel number stored in the channel storage are the same.

If the channel number indicated by the channel change instruction and the channel number stored in the channel storage are the same, the advertisement-related data output unit 11*b* determines whether the time T of the timer at the moment at which the channel change instruction is received satisfies either relation (1) or (2).

If the time T of the timer satisfies relation (1), the advertisement-related data output unit 11*b* outputs the advertisement-related data stored in the data storage unit 18 to the output unit 19, after the channel number is changed by the channel changing unit 11*a*. Accordingly, the output unit 19 outputs the advertisement-related data with the main program after the channel is changed.

If the time T of the timer satisfies relation (2), the advertisement-related data output unit 11*b* outputs the advertisement-related data stored in the data storage unit 18 to the output unit 19, when the STC of the data receiving device 10 reaches the display start enabled time (PTS of the advertisement-related data).

Here, advertisement-related data output processing performed by the advertisement-related data output unit 11*b* is described with reference to some examples. It is assumed that the time (display start enabled time) set in the PTS included in the PES header of the advertisement-related data is "10:30:00" and the lifetime is "600 (seconds)".

Described below is the case where the advertisement-related data output unit 11*b* receives a channel change instruction to return the viewing channel to the original channel from the time "10:30:00" to "10:40:00" after the timer has started. In this case, the advertisement-related data output unit 11*b* outputs the advertisement-related data stored in the data storage unit 18 to the output unit 19, after the channel number is changed by the channel changing unit 11*a*. Accordingly, the output unit 19 outputs the advertisement-related data with the main program after the channel is changed.

Described below is the case where the advertisement-related data output unit 11*b* receives a channel change instruction to return the viewing channel to the original channel at the time "10:29:00" after the timer has started. In this case, the advertisement-related data output unit 11b outputs the advertisement-related data stored in the data storage unit 18 to the output unit 19, when the STC of the data receiving device 10 reaches the time "10:30:00". Accordingly, the output unit 19 outputs the advertisement-related data with the main program after the channel is changed.

Described below is the case where the advertisement-related data output unit 11b receives a channel change instruction to return the viewing channel to the original channel at the time "10:43:00" after the timer has started. In this case, the advertisement-related data output unit 11b discards the advertisement-related data stored in the data storage unit 18, because the time T of the timer does not satisfy both relations (1) and (2). The advertisement-related data output unit 11b then stores the currently selected channel number in the channel storage.

The output unit 19 outputs decoded video data and the like. More specifically, the output unit 19 outputs the video data supplied from the video decoding unit 15, the audio data supplied from the audio decoding unit 16, the character data supplied from the data decoding unit 17, and the like. The output unit 19 also outputs the advertisement-related data output from the data storage unit 18 with the video data and the audio data.

Figure 5:
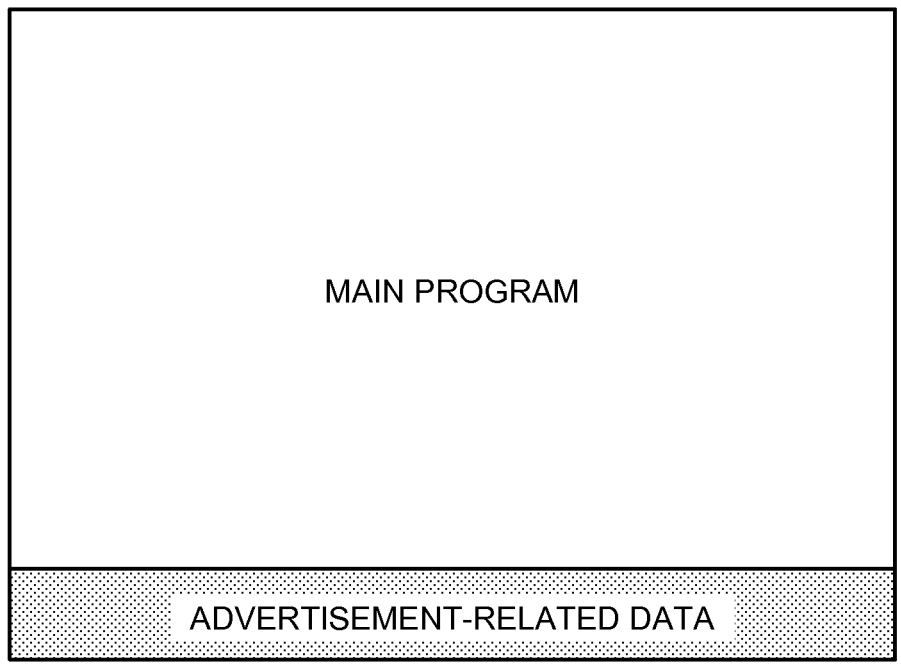
FIG. 5 is an example of a screen on which advertisement-related data is output.

When the advertisement-related data is output with the video data and the audio data, the output unit 19 of the first embodiment outputs the advertisement-related data as illustrated in FIG. 5. FIG. 5 is an example of a screen on which the advertisement-related data is output.

Figure 6:
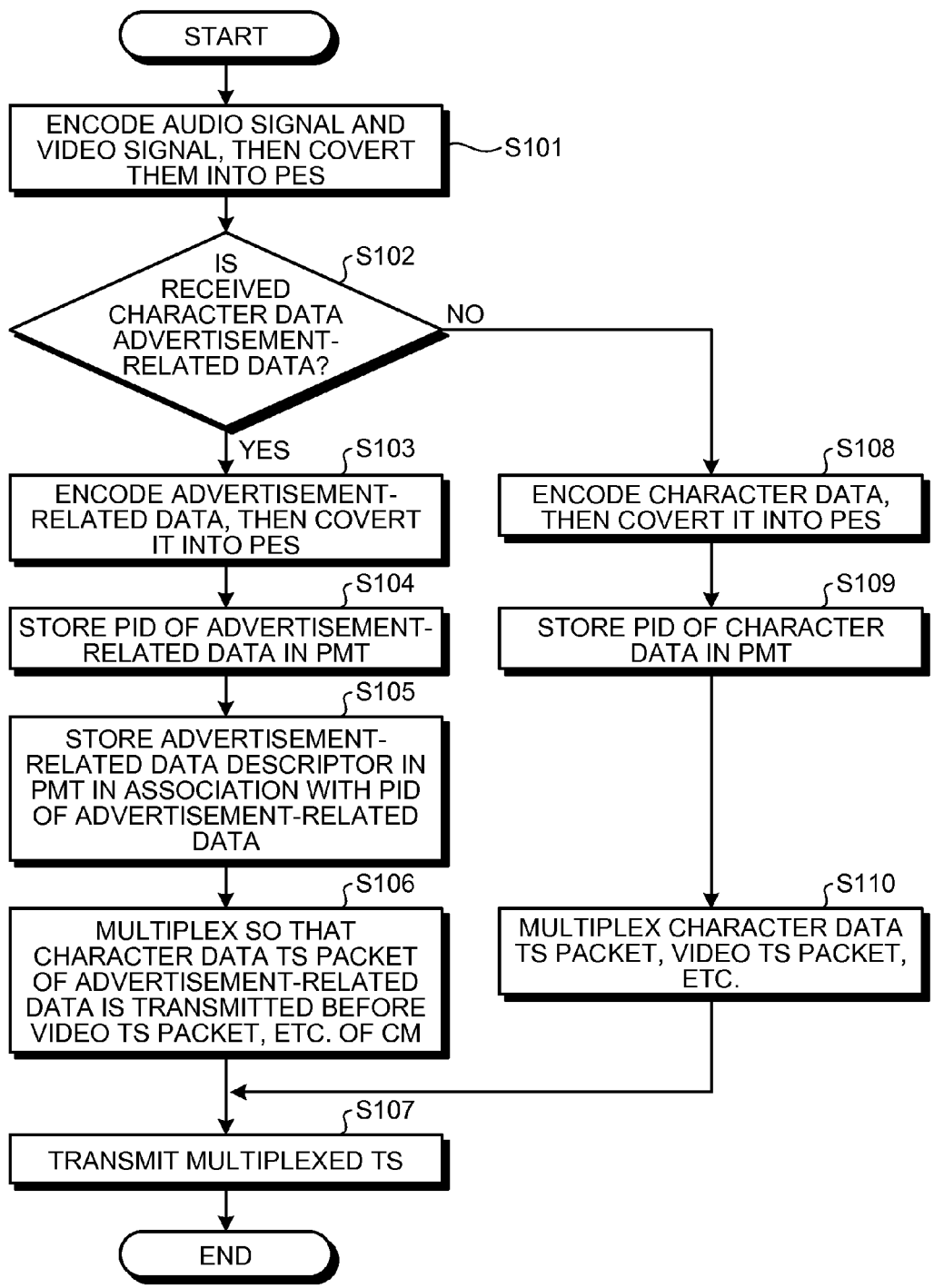
FIG. 6 is an example flowchart illustrating a TS transmission processing procedure performed by the data transmitting device according to the first embodiment.

A TS transmission processing procedure performed by the data transmitting device 100 according to the first embodiment will now be described with reference to FIG. 6. FIG. 6 is an example flowchart illustrating the TS transmission processing procedure performed by the data transmitting device 100 according to the first embodiment.

As illustrated in FIG. 6, upon receiving an audio signal and a video signal from the exterior, the audio/video encoding unit 120 encodes the received audio signal and the video signal, coverts them into the PES, and outputs the generated PES to the multiplexing unit 160 (Step S101). For example, the audio/video encoding unit 120 receives the audio signal and the video signal that form the main program and the commercial, and encodes the received audio signal and the video signal.

Upon receiving the advertisement-related data from the exterior (Yes at Step S102), the character data encoding unit 130 encodes the advertisement-related data, converts it into the PES, and outputs the generated PES to the multiplexing unit 160 (Step S103). At this time, the character data encoding unit 130 sets a display start time of the main program displayed after the commercial, to the PTS included in the header of the generated PES packet.

The program information generating unit 150 then stores the PID of the advertisement-related data TS packet in the PMT (Step S104). The program information generating unit 150 also stores the advertisement-related data descriptor in the PMT in association with the PID of the advertisement-related data TS packet (Step S105). More specifically, the program information generating unit 150 of the first embodiment sets "64" to the "descriptor_tag" of the advertisement-related data descriptor. The program information generating unit 150 also sets the "descriptor_length" and the "Living_time" in the advertisement-related data descriptor.

The multiplexing unit 160 divides the PES supplied from the audio/video encoding unit 120 and the PES supplied from the character data encoding unit 130, generates a TS packet, and multiplexes the generated TS packet. At this time, the multiplexing unit 160 multiplexes so that the advertisement-related data TS packet is transmitted before the video TS packet and the audio TS packet of the commercial corresponding to the advertisement-related data (Step S106). The multiplexing unit 160 then transmits the multiplexed TS (Step S107).

Upon receiving character data other than the advertisement-related data (No at Step S102), the character data encoding unit 130 encodes the received character data, coverts it to the PES, and outputs the generated PES to the multiplexing unit 160 (Step S108). The program information generating unit 150 then stores the PID of the character data TS packet in the PMT (Step S109).

The multiplexing unit 160 then divides the PES supplied from the audio/video encoding unit 120 and the PES supplied from the character data encoding unit 130, generates a TS packet, and multiplexes the generated TS packet (Step S110). The multiplexing unit 160 then transmits the multiplexed TS (Step S107).

In FIG. 6, the data transmitting device 100 receives the character data or the advertisement-related data after receiving the audio signal and the video signal. However, the order of receiving the audio signal, the video signal, or the character data is not limited thereto. For example, the data transmitting device 100 may receive the audio signal and the video signal after receiving the character data or the advertisement-related data, or may receive all the information simultaneously.

Figure 7:
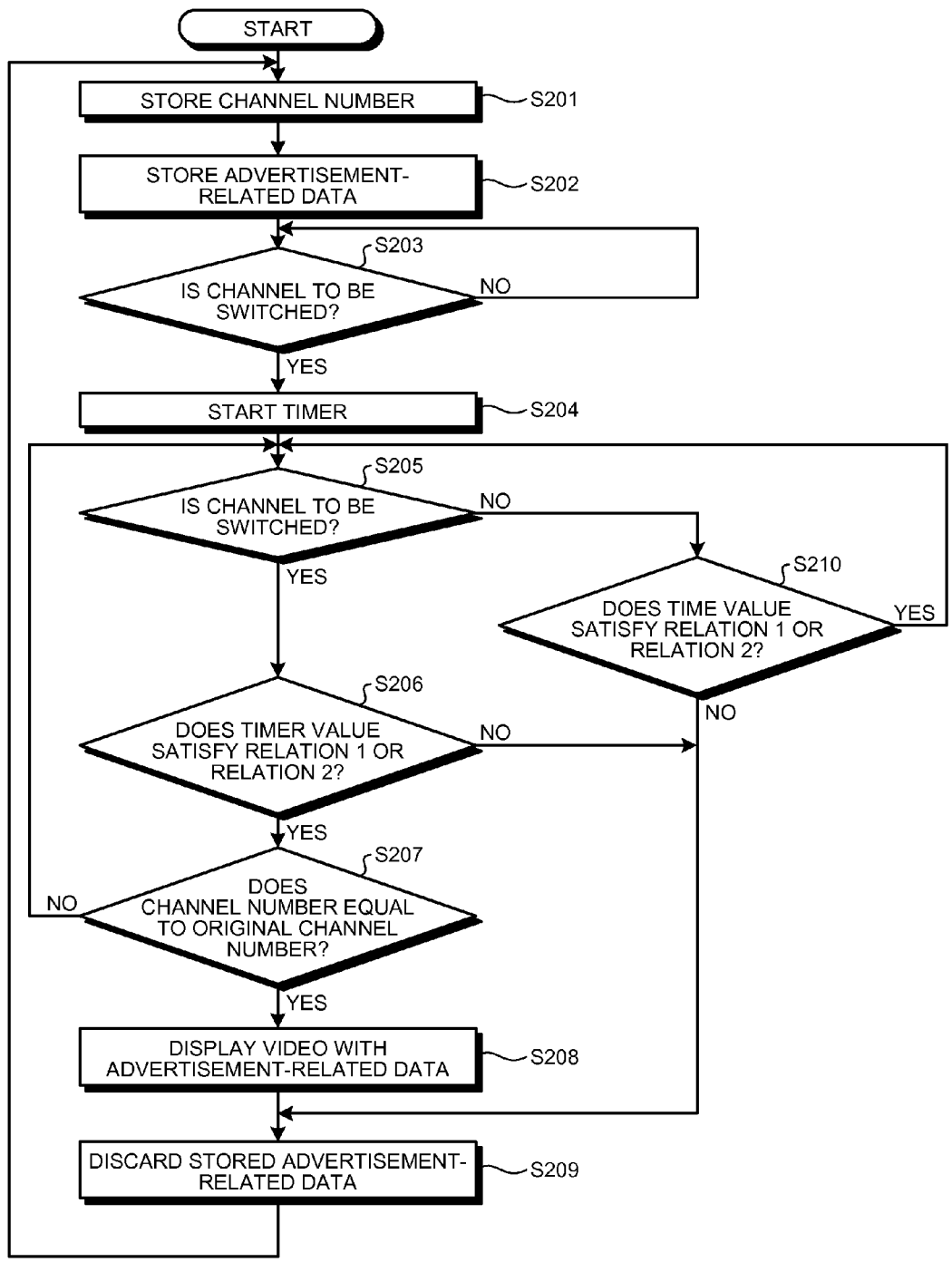
FIG. 7 is an example flowchart illustrating an advertisement-related data output processing procedure performed by the data receiving device according to the first embodiment.

An advertisement-related data output processing procedure performed by the data receiving device 10 according to the first embodiment will now be described with reference to FIG. 7. FIG. 7 is an example flowchart illustrating the advertisement-related data output processing procedure performed by the data receiving device 10 according to the first embodiment. Here, as an initial state, the data transmitting device 100 has not yet started the timer, and has not yet stored the channel number in the channel storage.

As illustrated in FIG. 7, the advertisement-related data output unit 11b of the data receiving device 10 stores a channel number in the channel storage (Step S201). If an advertisement-related data TS packet is supplied from the demultiplexer 14, the data decoding unit 17 decodes the character data TS packet and stores the advertisement-related data in the data storage unit 18 (Step S202).

Upon receiving a channel change instruction from the remote controller I/F 12 (Yes at Step S203), the advertisement-related data output unit 11b starts the timer (Step S204). Upon receiving the channel change instruction again (Yes at Step S205), the advertisement-related data output unit 11b determines whether the time T of the timer satisfies either relation (1) or (2) (Step S206).

If the time T of the timer satisfies either relation (1) or (2) (Yes at Step S206), the advertisement-related data output unit 11b determines whether the channel number to be changed by the channel change instruction received at Step S205 and the channel number stored in the channel storage are the same (Step S207).

If the channel numbers are matched (Yes at Step S207), the advertisement-related data output unit 11b outputs the advertisement-related data stored in the data storage unit 18 to the output unit 19. At this time, if the time T of the timer satisfies relation (1), the advertisement-related data output unit 11b outputs the advertisement-related data stored in the data storage unit 18 to the output unit 19, after the channel number is changed by the channel changing unit 11a. The output unit 19 then outputs the advertisement-related data with the main program after the channel is changed (Step S208).

If the time T of the timer satisfies relation (2), the advertisement-related data output unit 11b outputs the advertisement-related data stored in the data storage unit 18 to the output unit 19, when the STC of the data receiving device 10 reaches the display start enabled time of the advertisement-related data. The output unit 19 then outputs the advertisement-related data with the main program after the channel is changed (Step S208).

If the channel numbers do not match (No at Step S207), the advertisement-related data output unit 11b returns to the processing at Step S205. If the time T of the timer does not satisfy both relations (1) and (2) (No at Step S206), the advertisement-related data output unit 11b discards the advertisement-related data stored in the data storage unit 18 (Step S209) and returns to the processing at Step S201. More specifically, the advertisement-related data output unit 11b stores the currently selected channel number in the predetermined channel storage (Step S201).

Even if the channel change instruction is not received again (No at Step S205), the advertisement-related data output unit 11b regularly determines whether the time T of the timer satisfies relation (1) or (2) (Step S210). If the time T of the timer satisfies either relation (1) or (2) (Yes at Step S210), the advertisement-related data output unit 11b returns to the processing at Step S205, and regularly determines whether the time T of the timer satisfies relation (1) or (2), until the channel change instruction is received again (Step S210).

If the time T of the timer does not satisfy both relation (1) and (2) (No at Step S210), the advertisement-related data output unit 11b discards the advertisement-related data stored in the data storage unit 18 (Step S209) and returns to the processing at Step S201. More specifically, the advertisement-related data output unit 11b stores the currently selected channel number in the channel storage (Step S201).

As described above, the data transmitting device 100 according to the first embodiment transmits the advertisement-related data of the commercial before transmitting the video data and the audio data that form the commercial. Upon detecting that the channel being watched in real time is changed to another channel and then changed to the original channel again, the data receiving device 10 according to the first embodiment displays the advertisement-related data with the main program.

In other words, with the data transmitting device 100 and the data receiving device 10 according to the first embodiment, if the channel is switched to another channel only during commercial breaks, it is possible to make the viewers watch the advertisement-related data without fail.

The data transmitting device 100 according to the first embodiment generates an advertisement-related data TS packet in which the display start time of the main program displayed after the commercial is set to the PTS, and transmits it to the data receiving device 10. Accordingly, the data receiving device 10 can display the advertisement-related data with the main program.

The data transmitting device 100 according to the first embodiment transmits the lifetime that is a limited time during which the advertisement-related data can be started to display to the data receiving device 10. Accordingly, the data receiving device 10 can control the time from when the advertisement-related data can be displayed. For example, the data receiving device 10 can prevent the advertisement-related data from being displayed several days later.

[b] Second Embodiment

In the first embodiment, the advertisement-related data is transmitted as the character data TS packet. However, the data transmitting device may transmit the advertisement-related data as an event message. In a second embodiment, an example of a data transmitting device that transmits the advertisement-related data as the event message will be described.

A data transmitting device 200 according to the second embodiment will now be described. A configuration of the data transmitting device 200 according to the second embodiment is the same as the configuration (see FIG. 2) of the data transmitting device 100 according to the first embodiment. The event generating unit 140 of the second embodiment receives advertisement-related data as event data from the exterior. More specifically, the event generating unit 140 sets the received advertisement-related data in a data event, and generates event sections. The data event to which the advertisement-related data is set is referred to as an "advertisement-related data event", and the event message of the advertisement-related data event is referred to as an "advertisement-related data event message" below.

The advertisement-related data event will now be described in detail with reference to FIG. 8. FIG. 8 is an example configuration of the advertisement-related data event. The advertisement-related data event illustrated in FIG. 8 is a descriptor in which General_event_descriptor that is an event defined in the ARIB standard is expanded. In FIG. 8, the descriptor is noted as "CM_event_descriptor". Some of the fields of the advertisement-related data event illustrated in FIG. 8 will be described below.

"descriptor_tag" is an 8-bit field to identify the type of the event_descriptor. The event generating unit 140 sets one of values from "0x80" to "0xBF" that can be defined, for example, by being operated by the provider or the like, to the "descriptor_tag". Accordingly, the data receiving device 10 can determine that the event_descriptor whose "descriptor_tag" is any one of the values from "0x80" to "0xBF", is the CM_event_descriptor. As a result, the data receiving device 10 can distinguish the advertisement-related data event from the data event other than the advertisement-related data event.

"descriptor_length" is an 8-bit field indicating the byte length of the event_descriptor. The event generating unit 140, for example, sets "13"+"the number of bytes of the advertisement-related character data" to the "descriptor_length".

"event_msg_group_id" is a 12-bit field indicating an identifier for identifying an event message group. The event generating unit 140, for example, sets "0" as an identifier of the advertisement-related data event message group to the "event_msg_group_id".

"reserved_future_use" is an expandable 4-bit field. The event generating unit 140, for example, sets "1111" in binary to the "reserved_future_use".

"time_mode" is an 8-bit field indicating a specification method of time at which the event message is to be generated. The data transmitting device 100 sets "0x00" to the "time_mode". Accordingly, the data receiving device 10 can generate an event message immediately after receiving the advertisement-related data event message.

"event_msg_type" is an identifier indicating the type of the event message, and is an 8-bit field. The event generating unit 140, for example, sets "0" to the "event_msg_type" as an identifier of the advertisement-related data event message.

"event_msg_id" is a 16-bit field indicating an identifier for identifying individual event message. The event generating unit 140, for example, if four advertisement-related data event messages are to be transmitted, sets "0", "1", "2", and "3" to the "event_msg_id".

"CM_PTS" is a 33-bit field indicating the display start enabled time of the advertisement-related data. The event generating unit 140 sets the display start enabled time of the main program to be displayed after the commercial indicated by the advertisement-related data to the "CM_PTS". The "CM_PTS" can be accurately set by the unit of 90 [kHz].

"marker_bit" is a 1-bit field for byte alignment. The event generating unit 140 sets "1" to the "marker_bit".

"Living_time" is a 16-bit field indicating the lifetime of the advertisement-related data, and is set in seconds. The lifetime is a period from the display start enabled time of the advertisement-related data indicated by the "CM_PTS" to the time from when the advertisement-related data can be displayed.

"data_byte" is a field to which the advertisement-related data is set. The event generating unit 140 sets advertisement-related data of 243 bytes at maximum, to the "data_byte".

The event generating unit 140 of the second embodiment, for example, sets values as indicated below to the fields of the advertisement-related data event described above.

descriptor_tag: "0x80"
descriptor_length: "113"
event_msg_group_id: "0"
time_mode: "0x00"
event_msg_type: "0"
event_msg_id: "0"
CM_PTS: display start time of the main program to be displayed after the commercial
Living_time: "120"
data_byte: character data of the advertisement-related data (100 bytes)

Accordingly, upon receiving an event message whose "descriptor_tag" is "0x80", the data receiving device 10 can identify that the event message is the advertisement-related event message.

The program information generating unit 150 according to the second embodiment does not set the descriptor of the PMT in association with the PID of the advertisement-related event message, to distinguish the advertisement-related data event from the other data event. This is because, as described above, the receiving side can distinguish the advertisement-related data event from the other data event, based on the information set in the "descriptor_tag" of the "CM_event_descriptor".

If an advertisement image that forms the commercial is an advertisement image group including a plurality of advertisement images, the event generating unit 140 of the data transmitting device 200 sets the advertisement images in association with the advertisement-related event messages by using the event_msg_id. For example, the event generating unit 140 associates the sequence of the advertisement images with the sequence of values of the event_msg_id (such as 0, 1, 2, and 3). Accordingly, the data receiving device can display a plurality of types of advertisement-related data.

Upon receiving a section of the advertisement-related data event from the event generating unit 140, the multiplexing unit 160 of the second embodiment multiplexes so that the advertisement-related data event message is transmitted before the video TS packet and the audio TS packet of the commercial corresponding to the advertisement-related data, based on the instruction from the control unit 110.

A data receiving device 20 according to the second embodiment will now be described. A configuration of the data receiving device 20 according to the second embodiment is the same as the configuration of the data receiving device 10 according to the first embodiment (see FIG. 4). The demultiplexer 14 in the second embodiment demultiplexes a TS supplied from the tuner 13, and outputs a TS packet of the event message among the separated TS packets, to the data decoding unit 17.

The data decoding unit 17 in the second embodiment analyzes the event message supplied from the demultiplexer 14. More specifically, the data decoding unit 17 obtains information set in the fields of the event_descriptor. If the "descriptor_tag" is "0x80", for example, the data decoding unit 17 determines that the event message is the advertisement-related event message.

Upon determining that the event message is the advertisement-related event message, the data decoding unit 17 outputs the display start enabled time set in the "CM_PTS" of the "CM_event_descriptor" and the lifetime set in the "Living_time" to the control unit 11. The data decoding unit 17 also outputs the advertisement-related data set in the "data_byte" of the "CM_event_descriptor" to the data storage unit 18.

The advertisement-related data output unit 11b of the control unit 11 performs the same processing as the advertisement-related data output processing described in the first embodiment, by using the display start enabled time and the lifetime supplied from the data decoding unit 17.

Figure 9:
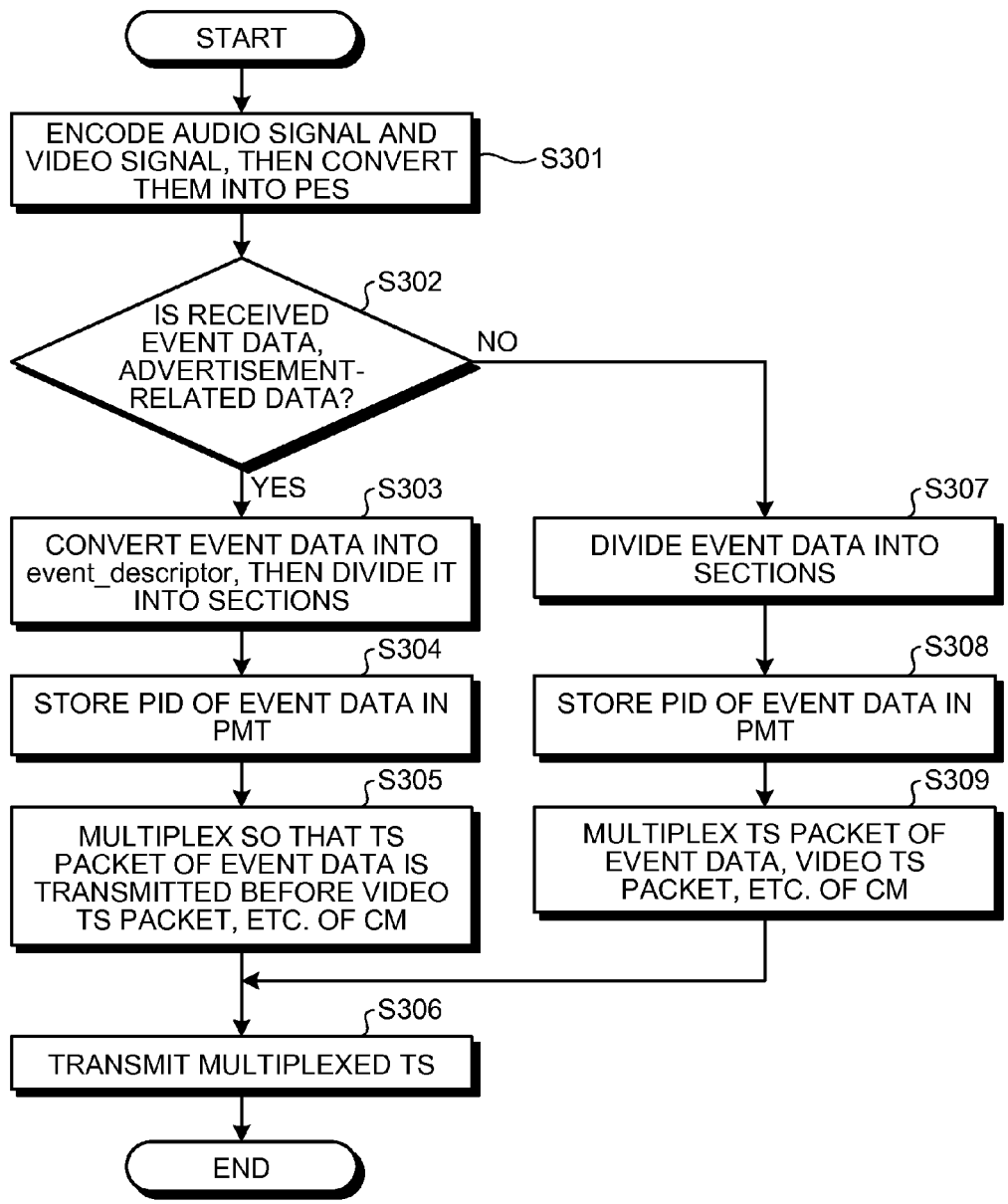
FIG. 9 is an example flowchart illustrating a TS transmission processing procedure performed by a data transmitting device according to a second embodiment.

A TS transmission processing procedure performed by the data transmitting device 200 according to the second embodiment will now be described with reference to FIG. 9. FIG. 9 is an example flowchart illustrating the TS transmission processing procedure performed by the data transmitting device 200 according to the second embodiment. Here, description of a processing procedure similar to the processing procedure illustrated in FIG. 6 will be omitted.

Upon receiving the event data of the advertisement-related data from the exterior (Yes at Step S302), the event generating unit 140 of the data transmitting device 200 converts the received advertisement-related data into the event_descriptor, divides it into sections, and generates event sections (Step S303).

The program information generating unit 150 then stores the PID of the advertisement-related event message in the PMT (Step S304). The multiplexing unit 160 then multiplexes so that the advertisement-related event message is transmitted before the video TS packet and the audio TS packet of the commercial corresponding to the advertisement-related data (Step S305). The multiplexing unit 160 then transmits the multiplexed TS (Step S306).

Upon receiving the event data other than the advertisement-related data from the exterior (No at Step S302), the event generating unit 140 divides the received event data into sections and generates event sections (Step S307).

The program information generating unit 150 then stores the PID of the event message in the PMT (Step S308). The multiplexing unit 160 then divides the PES supplied from the audio/video encoding unit 120 and the event sections supplied from the event generating unit 140, generates a TS packet, and multiplexes the generated TS packet (Step S309). The multiplexing unit 160 then transmits the multiplexed TS (Step S306).

As described above, the data transmitting device 200 according to the second embodiment transmits the advertisement-related data of the commercial as the event message, before transmitting the video data and the audio data that form the commercial. Upon detecting that the channel being watched in real time is changed to another channel and then changed to the original channel again, the data receiving device 20 according to the second embodiment displays the advertisement-related data with the main program.

In this manner, with the data transmitting device 200 and the data receiving device 20 according to the second embodiment, if the channel is switched to another channel only during commercial breaks, it is possible to make the viewers watch the advertisement-related data without fail.

In the first and second embodiments, a commercial of sweets or the like is given as an example, and information such as the name of a company that manufactures the sweets, the name of the sweets, the characteristics of the sweets, and the sales points is given as examples of the advertisement-related data. However, the advertisement-related data is not limited thereto, and is not limited to a so-called commercial to promote a product. The advertisement-related data is a concept widely including information provided to viewers in the perspective different from the main program and information that may be skipped by the viewers. For example, the advertisement-related data includes introduction of a sponsor in the program (a "brought to you by" screen), a notification of an event in the program, a scene in a drama and the like in which a product of the sponsor is used, and a notification that the broadcast time of the next program is changed due to the extended broadcast.

On the processes described in the present embodiments, all or a part of the processes described as being automatically performed may be manually performed, or all or a part of the processes described as being manually performed may be automatically performed with a known method. The information including the process procedures (such as FIG. 6, FIG. 7, and FIG. 9), specific names, and various kinds of data and parameters illustrated in the specification or in the drawings can be optionally changed, unless otherwise specified.

The respective constituents of the illustrated apparatuses are functionally conceptual, and need not be physically configured as illustrated (such as FIG. 2 and FIG. 4). In other words, the specific mode of dispersion and integration of each apparatus is not limited to the ones illustrated in the drawings, and all or a part thereof can be functionally or physically dispersed or integrated in an optional unit, depending on various kinds of load and the status of use. All or an optional part of the respective processing functions carried out in each apparatus are realized by a central processing unit (CPU) and a computer program analyzed and executed by the CPU, or may be realized as hardware by the wired logic.

Figure 10:
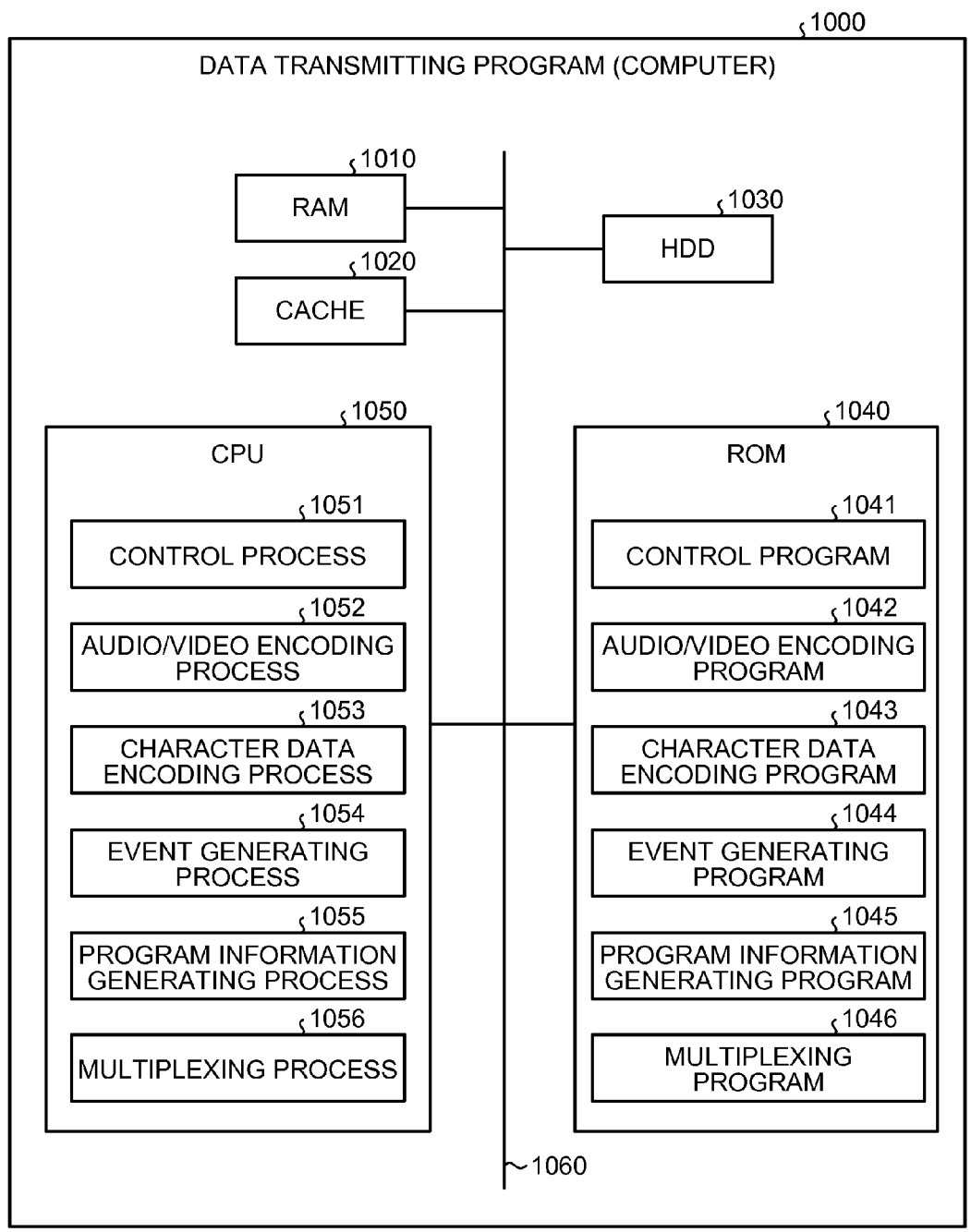
FIG. 10 is a schematic of a computer that executes a data transmitting program.
Figure 11:
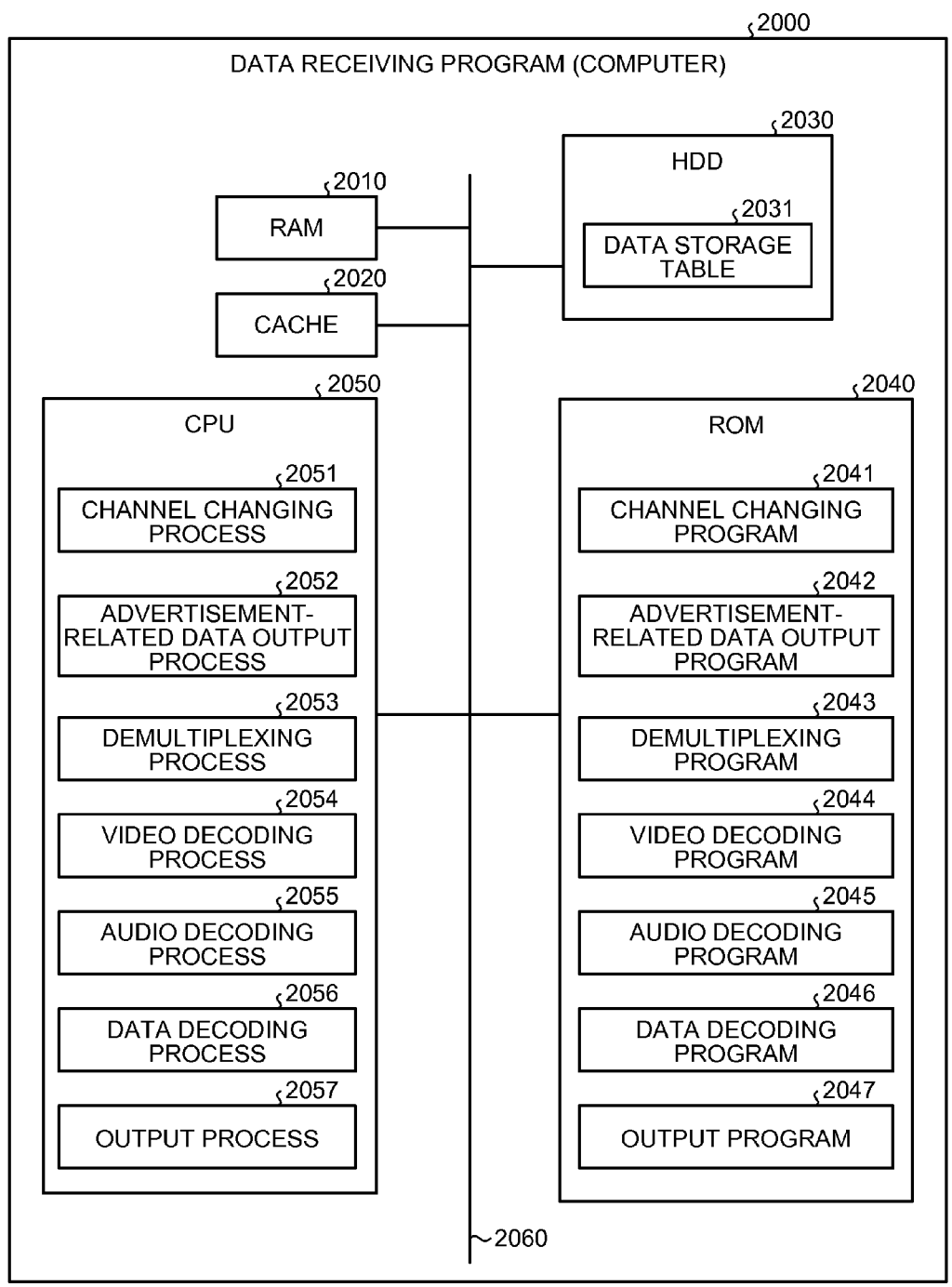
FIG. 11 is a schematic of a computer that executes a data receiving program.

The various types of processes described in the embodiments can be realized by executing prepared computer programs with a computer such as a personal computer and a work station. Accordingly, an example of a computer that executes a data transmitting program and a computer that executes a data receiving program having functions similar to those of the embodiments will be described below with reference to FIG. 10 and FIG. 11. FIG. 10 is a schematic of a computer that executes the data transmitting program, and FIG. 11 is a schematic of a computer that executes the data receiving program.

As illustrated in FIG. 10, a data transmitting program (computer) 1000 is configured to connect a random access memory (RAM) 1010, a cache 1020, a hard disk drive (HDD) 1030, a read only memory (ROM) 1040, and a CPU 1050 through a bus 1060. The ROM 1040 stores therein a data transmitting program having the same functions as those of the embodiments. In other words, as illustrated in FIG. 10, the ROM 1040 stores therein a control program 1041, an audio/video encoding program 1042, a character data encoding program 1043, an event generating program 1044, a program information generating program 1045, and a multiplexing program 1046.

The CPU 1050 reads and executes the programs 1041 to 1046, and thus the programs 1041 to 1046 function as a control process 1051, an audio/video encoding process 1052, a character data encoding process 1053, an event generating process 1054, a program information generating process 1055, and a multiplexing process 1056 as illustrated in FIG. 10. Each of the processes 1051 to 1056 corresponds to the control unit 110, the audio/video encoding unit 120, the character data encoding unit 130, the event generating unit 140, the program information generating unit 150, and the multiplexing unit 160 illustrated in FIG. 2.

The programs 1041 to 1046 need not be stored in the ROM 1040 in advance. For example, the programs 1041 to 1046 may be stored in a "portable physical medium" such as a flexible disk (FD), a compact disc-read only memory (CD-ROM), a magneto optical (MO) disk, a digital versatile disk (DVD), a magnetic optical disk, and an integrated circuit (IC) card that can be inserted into the computer 1000; in a "fixed physical medium" such as a hard disk drive (HDD) provided inside and outside of the computer 1000; or in "another computer (or server)" connected to the computer 1000 via a public line, the Internet, a local area network (LAN), a wide area network (WAN), or the like. The computer 1000 can read out each computer program therefrom, and execute it.

As illustrated in FIG. 11, a data receiving program (computer) 2000 is configured to connect a RAM 2010, a cache 2020, an HDD 2030, a ROM 2040, and a CPU 2050 through a bus 2060. The ROM 2040 includes a data receiving program that exhibits the same function as that of the embodiments described above. In other words, as illustrated in FIG. 11, the ROM 2040 stores therein a channel changing program 2041, an advertisement-related data outputting program 2042, a demultiplexing program 2043, a video decoding program 2044, an audio decoding program 2045, a data decoding program 2046, and an outputting program 2047.

When the CPU 2050 reads and executes the computer programs 2041 to 2047, as illustrated in FIG. 11, each of the computer programs 2041 to 2047 functions as a channel changing process 2051, an advertisement-related data outputting process 2052, a demultiplexing process 2053, a video decoding process 2054, an audio decoding process 2055, a data decoding process 2056, and an outputting process 2057. Each of the processes 2051 to 2057 corresponds to the channel changing unit 11a, the advertisement-related data output unit 11b, the demultiplexer 14, the video decoding unit 15, the audio decoding unit 16, the data decoding unit 17, and the output unit 19 as illustrated in FIG. 4.

The HDD 2030, as illustrated in FIG. 11, includes a data storage table 2031. The data storage table 2031 corresponds to the data storage unit 18 illustrated in FIG. 4.

The above-described computer programs 2041 to 2047 need not be stored in the ROM 2040 but for example, may be stored in a "portable physical medium" such as a flexible disk (FD), a CD-ROM, an MO disk, a DVD, and an IC card that can be inserted into the computer 2000; in a "fixed physical medium" such as a hard disk drive (HDD) provided inside and outside of the computer 2000; or in "another computer (or server)" connected to the computer 2000 via the public line, the Internet, the LAN, the WAN, or the like. The computer 2000 can read out each computer program therefrom, and execute it.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A digital broadcast method comprising:
   acquiring, by a data transmitting device, audio data and video data that form a predetermined content for digital broadcasting, and related data indicating a content related to the predetermined content;
   performing, by the data transmitting device, a control that transmits the acquired related data to a data receiving device prior to transmitting the acquired audio data and the acquired video data;
   storing, by the data receiving device, an identifier of a first channel selected by a viewer in a channel storage;
   receiving, by the data receiving device, the audio data and the video data that form the predetermined content corresponding to the first channel and the related data of the predetermined content that have been subject to the control;
   storing, by the data receiving device, the received related data in a data storage;
   changing, by the data receiving device, a viewing channel by receiving a changing instruction of the viewing channel from the viewer;
   deleting, by the data receiving device, the related data stored in the data storage and replacing the identifier of the first channel stored in the channel storage by an identifier of the currently selected channel when the viewing channel is not changed before a predetermined time has passed since the viewing channel is changed at the changing;
   determining, by the data receiving device, when the viewing channel is further changed before the predetermined time has passed since the viewing channel is changed at the changing, whether the lastly selected channel is identical to the first channel by comparing an identifier of the lastly selected channel and the identifier stored in the channel storage; and
   outputting, by the data receiving device, when the lastly selected channel is identical to the first channel, the related data stored in the data storage with audio data and video data corresponding to the lastly selected channel to an output unit.

2. The digital broadcast method according to claim 1, further comprising:
   encoding, by the data transmitting device, the related data to generate a packet including display time information that is a time at which the related data is displayed by the data receiving device; and
   generating lifetime information that is a period from a time indicated by the display time information to a time when the related data is allowed to be displayed, wherein
   the performing includes transmitting the packet including the generated display time information and the generated lifetime information to the data receiving device,
   the receiving the audio data, the video data, and the related data includes further receiving the packet including the display time information and the lifetime information that have been subject to the control, and
   the outputting includes outputting the related data with the audio data and the video data corresponding to the lastly selected channel to the output unit, when a channel changing time that is a time at which the viewing channel is changed to the lastly selected channel falls within a time period from a display time indicated by the display time information to a time obtained by adding the period indicated by the lifetime information to the display time.

3. The digital broadcast method according to claim 2, wherein the outputting includes outputting the related data with the audio data and the video data corresponding to the first channel to the output unit, when a time reaches the display time if the channel changing time is before the display time.

4. A data receiving device comprising:
   a channel storage that stores an identifier of a first channel selected by a viewer;
   a receiving unit that receives audio data and video data that form a predetermined content corresponding to the first channel for digital broadcasting, and related data indicating a content related to the predetermined content;
   a data storage that stores the received related data;
   a channel changing unit that changes a viewing channel by receiving a changing instruction of the viewing channel from the viewer; and
   a related-data output unit
      that deletes the related data stored in the data storage and that replaces the identifier of the first channel stored in the channel storage by an identifier of the currently selected channel when the viewing channel is not changed before a predetermined time has passed since the viewing channel is once changed by the channel changing unit;
      that determines, when the viewing channel is further changed before the predetermined time has passed since the viewing channel is once changed by the channel changing unit, whether the lastly selected channel is identical to the first channel by comparing an identifier of the lastly selected channel and the identifier stored in the channel storage; and
      that outputs, when the lastly selected channel is identical to the first channel, the related data stored in the data storage with audio data and video data corresponding to the lastly selected channel to an output unit.

5. The data receiving device according to claim 4, wherein the receiving unit further receives display time information that is a time to display the related data and lifetime information that is a period from a time indicated by the display time information to a time when the related data is allowed to be displayed, and
   the related-data output unit outputs the related data with the audio data and the video data corresponding to the lastly selected channel to the output unit, when a channel changing time that is a time at which the viewing channel is changed to the lastly selected channel falls within a time period from a display time indicated by the display time information to a time obtained by adding the period indicated by the lifetime information to the display time.

6. The data receiving device according to claim 5, wherein the related-data output unit outputs the related data with the audio data and the video data corresponding to the first channel to the output unit, when a time reaches the display time if the channel changing time is before the display time.

7. A data receiving method comprising:
   storing an identifier of a first channel selected by a viewer in a channel storage;
   receiving audio data and video data that form a predetermined content corresponding to the first channel for digital broadcasting, and related data indicating a content related to the predetermined content;
   storing, by the data receiving device, the received related data in a data storage;
   changing a viewing channel by receiving a changing instruction of the viewing channel from the viewer;

deleting the related data stored in the data storage and replacing the identifier of the first channel stored in the channel storage by an identifier of the currently selected channel when the viewing channel is not changed before a predetermined time has passed since the viewing channel is changed at the changing;

determining when the viewing channel is further changed before the predetermined time has passed since the viewing channel is changed at the changing, whether the lastly selected channel is identical to the first channel by comparing an identifier of the lastly selected channel and the identifier stored in the channel storage; and outputting, when the lastly selected channel is identical to the first channel, the related data stored in the data storage with audio data and video data corresponding to the lastly selected channel to an output unit.

* * * * *